INVENTOR.
CLARENCE W. CARLSON
BY
Orland M. Christensen
ATTORNEY

INVENTOR.
CLARENCE W. CARLSON
BY
Orland M. Christensen
ATTORNEY

Dec. 13, 1966 C. W. CARLSON 3,290,950
MECHANICAL MOVEMENT FOR TRANSLATING RECTILINEAR MOVEMENT
INTO ROTARY MOVEMENT, AND ENGINE INCORPORATING THE SAME
Filed July 22, 1965 3 Sheets-Sheet 3

INVENTOR.
CLARENCE W. CARLSON
BY
Osland M. Christensen
ATTORNEY

United States Patent Office

3,290,950
Patented Dec. 13, 1966

3,290,950
MECHANICAL MOVEMENT FOR TRANSLATING RECTILINEAR MOVEMENT INTO ROTARY MOVEMENT, AND ENGINE INCORPORATING THE SAME
Clarence W. Carlson, 11314 Hugginsmeyers Road, Tacoma, Wash.
Filed July 22, 1965, Ser. No. 473,963
23 Claims. (Cl. 74—52)

This invention concerns a mechanical movement for use intermediate a piston or piston rod that is reciprocable along a straight line axially of its cylinder, and a crankshaft rotatable about an axis aligned with but perpendicular to the line of such reciprocation, the mechanical movement incorporating two crank arms in place of the usual connecting rod, in addition to the usual crank arm that is fast upon and that rotates with the crankshaft. These two additional crank arms are interconnected and controlled by gearing so that they come into alignment, and when so aligned stand substantially at a right angle to the crank arm upon the crankshaft, at the instant the power impulse is imparted to the piston and piston rod, the latter having substantially reached a limit of their reciprocation at this instant. Thereby the mechanical advantage and the moment arm by which the power impulse is imparted to the crankshaft is most favorable, and wear on the parts is least. The invention also concerns the gearing interconnecting the three crank arms, and the engine that incorporates such a mechanical movement.

*Background of the invention.*—Heretofore it has been conventional to connect the crank arm of a driven crankshaft to a piston or to a piston rod by means of a connecting rod journaled to each thereof. Substantially when the piston reaches its limit of reciprocation, the connecting rod and the crank arm come substantially into alignment, and are more or less thus aligned when a power impulse is imparted to the piston. This power impulse, acting towards the crank arm that is nearly aligned with the connecting rod, causes a large force to be imparted to the crank arm at a very small moment arm and minimum mechanical advantage. This creates resistance which absorbs a part of the force, and wear, and requires parts to be strong enough to withstand such a large force. This invention, by improving the moment arm and mechanical advantage at the instant of imparting the power impulse, reduces materially the resistance and wear, improves the efficiency of the engine, and permits parts to be made less strong and consequently lighter.

No prior art, other than the previously mentioned conventional arrangement of piston or piston rod, connecting rod, and crank arm, is known. A French patent, 1st addition (No. 54,335) to Patent No. 916,300 discloses one crank arm the rotary motion whereof is converted into rectilinear motion across the axis of a second crank arm by gears that regulate such conversion, but there are but two crank arms, not three, and this device is not incorporated in an engine, nor is it directed to the application of a power impulse at a more favorable moment arm, nor to increase the efficiency and lessen the wear of an engine.

*Description of the invention.*—The invention is designed to be embodied in an engine, and will be so described. It can, however, be embodied in a pump. The engine must have at least one cylinder and a piston reciprocable therein. The invention is preferably incorporated in an engine with opposed cylinders, the pistons whereof are joined by a common piston rod—whether there be a single bank of opposed cylinders of two, three, or more banks, is immaterial. Also, it is immaterial whether the banks of pistons be at 180° to one another, or at a lesser angle. It will be described as incorporating a single bank of two opposed pistons, as illustrative of the principles incorporated in more complex engines. The references to this specific embodiment are to be understood not as restrictive, but as illustrative.

The mechanical movement of this invention, in the form to be described, is relatively simple, compact, and inexpensive.

Figure 7:
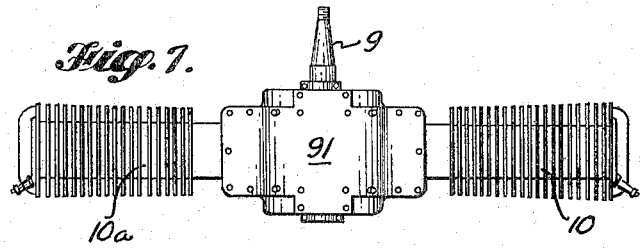
FIGURE 7 is an external plan view of a single-bank engine incorporating the invention.
Figure 8:
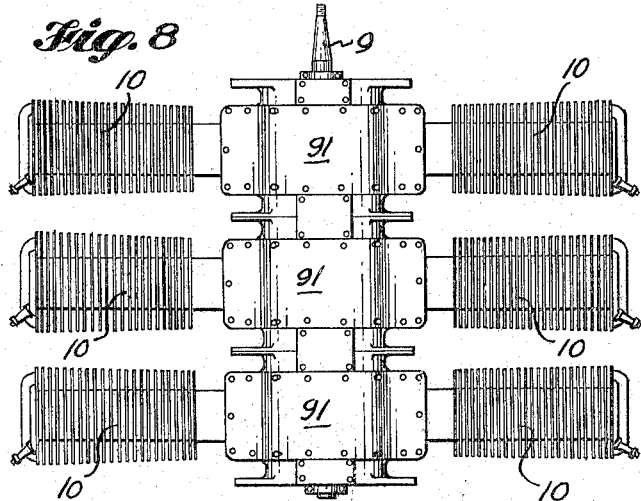
FIGURE 8 is a plan view of a three-bank double opposed engine incorporating the invention.

The engine used to illustrate the principles of this invention comprises a piston 1 reciprocable within a cylinder 10, with the piston rod 11 guided by a head that closes the cylinder at 12 for movement along the axis of cylinder 10. The engine shown having a second left hand cylinder 10a (FIGURE 7) removed 180° from right hand cylinder 10, the piston rod is extended at 11a to the opposite piston (not shown). Between the cylinders a crankshaft 9 that is to be driven is journaled at 90 to rotate about an axis that is aligned with the cylinders' common axis, but that is disposed at right angles thereto. A casing 91 concentric with the crankshaft axis encloses the crank arm 3 of the crankshaft, and the mechanical movement that interconnects the piston rod 11, 11a and the crankshaft 9. This and other crank arms may be doubled, but will be referred to in the singular.

It will be convenient to describe first the elements incorporated in this mechanical movement, and then to follow through its operation. In all, three crank arms are involved, the crank arm 2 journaled by the bearing 13 so that its outer end revolves 360° about the axis of pin 20 upon the piston rod 11 midway between the two pistons (which pin 20 will be considered as located at the inner end of crank arm 2), the crank arm 3, the inner end whereof is fixed to or integral with the crankshaft 9, and the outer end whereof is revoluble 360° about the latter's axis during the operation of rotating the crankshaft, and a third crank arm 5 that interconnects the outer ends of crank arms 2 and 3. Crank arms 2 and 3 are shown as alike in radial extent, but this is not essential. They may be unlike in this respect, and if so regulation of the instant of firing at full compression is governed by appropriate variation of the length of crank arm 5 and crank arm 2, perhaps accompanied by comparative changes in the dimensions of gears 31 and 21, also referred to later. If crank arm 2 is longer than crank arm 3, the crank arm 5 should be shorter than it is shown. A large gear 4, preferably a ring gear, is fixed to casing 91, concentrically of the axis of crankshaft 9. Meshing with the ring gear 4 is a large planetary gear 40, of half the diameter of gear 4. It is mounted to rotate about crank pin 30 at the outer end of crank arm 3 as that crank arm revolves about the axis of crankshaft 9. The crank arm 5 is carried mutually by the pin 30, and by a pin 22 at the outer end of crank arm 2. The crank arm 5 is free to rotate bodily with respect to pin 22, but reversely of the sense of the other two crank arms, and is fixed with relation to pin 30, so that as the crank arm 3 revolves, the crank arm 5 will revolve and rotate bodily with it. A gear train is involved in this, including a pinion 31 keyed to the outer end of crank pin 30, so that it turns on its axis through 360° with each revolution of crank arm 3, a pinion 31 fixed with relation to and carried by the outer end of crank arm 2, and a reversing idler gear 50 intermeshed with but not necessarily of the same sizes as gears 21 and 31, and freely rotative about pin 51 upon the third crank arm 5. The gears 21 and 31, herein shown as of like diameter, would always be so related, but if adjustment of the optimum angle of crank arm 3, for example, past dead center at the instant of firing, is desired the crank arms 2 and 3 would be of unlike diameter, although this would require change in the diameters of gears 21 and 31, each being of equal diameter to the other.

Figure 1:
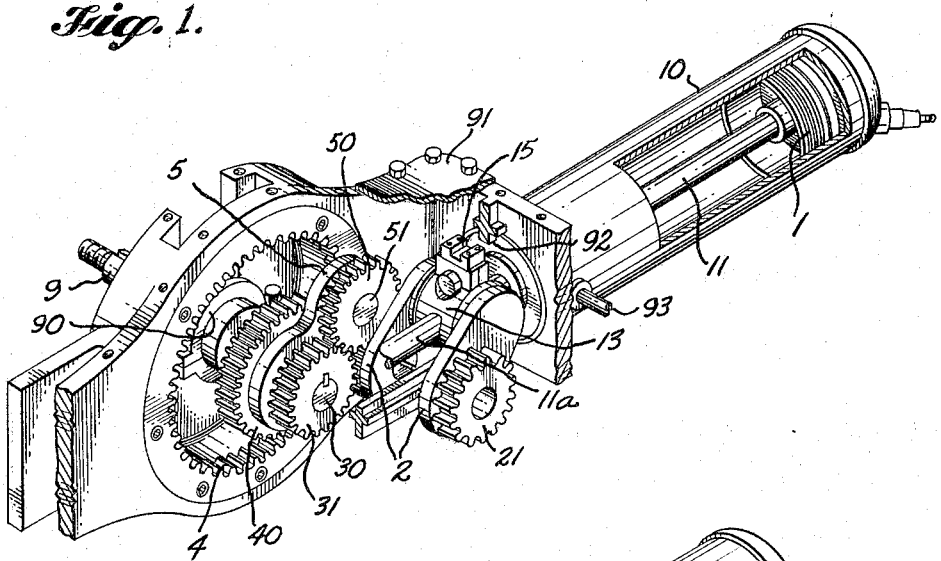
FIGURE 1 is an isometric view, partly broken away, showing one piston and cylinder of a two-bank double opposed internal combustion engine, the crankshaft thereof, and the interconnecting mechanical movement, all assembled.
Figure 2:
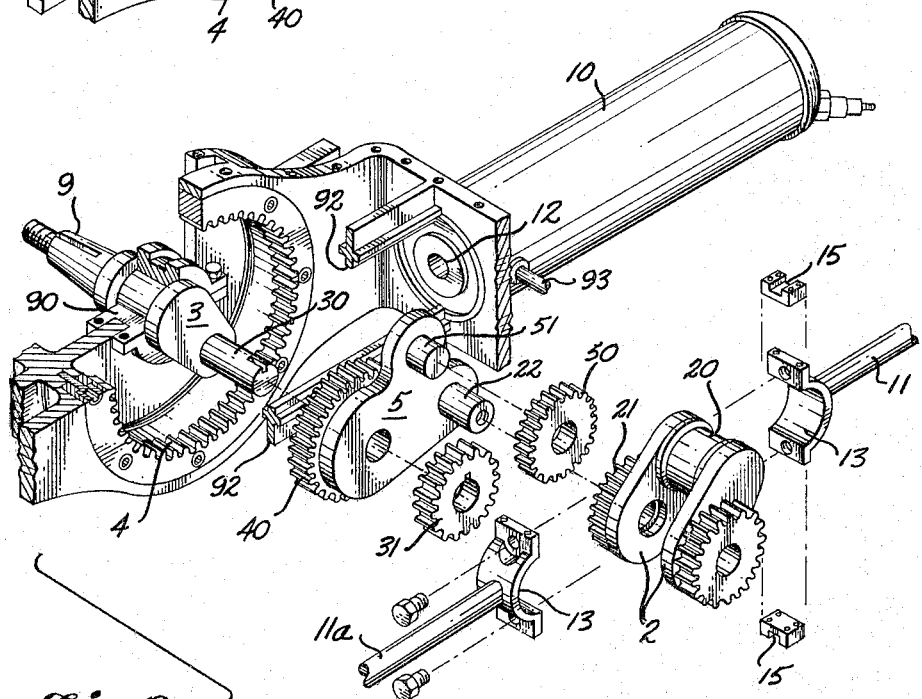
FIGURE 2 is a similar but exploded view of the same.
Figure 4:
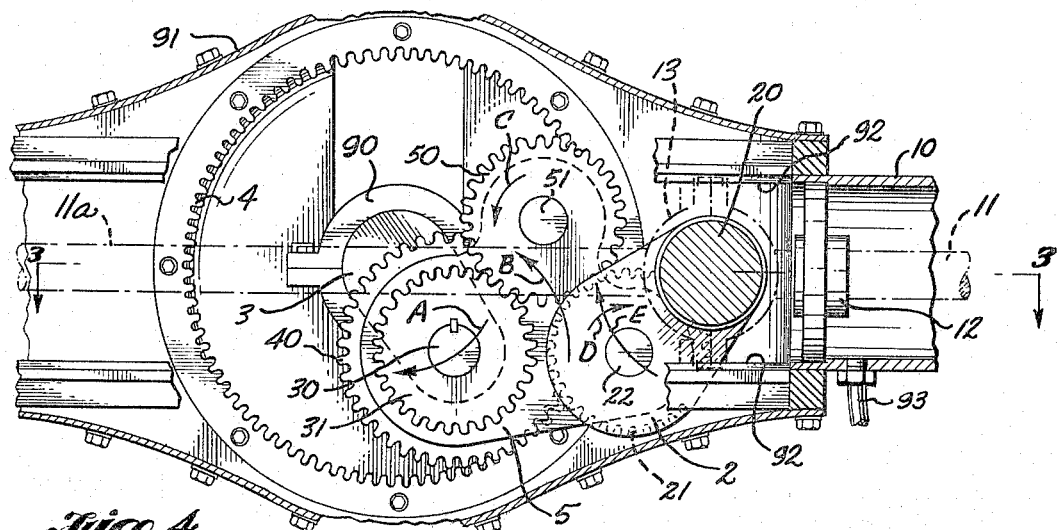
FIGURE 4 is an elevational view, transversely of the crankshaft, with parts in the corresponding positions.
Figure 3:
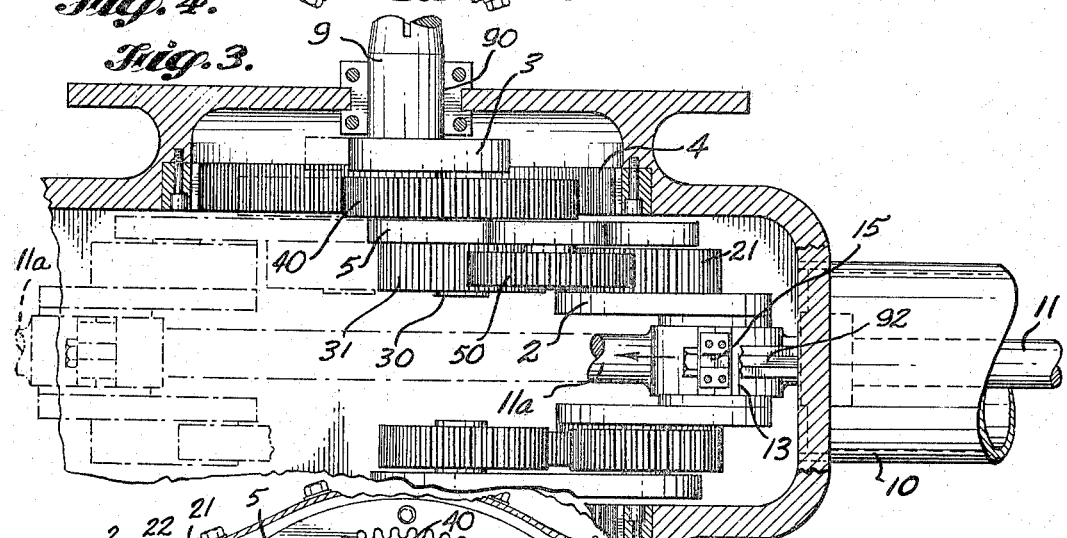
FIGURE 3 is a plan view of the mechanical movement and the crankshaft, the casing whereof is in section at the line 3—3 of FIGURE 4, showing parts approaching full compression in the right hand cylinder.

If it be assumed that parts are in the position shown in FIGURES 1, 3 and 4, it will be seen that sufficient additional rotation in the directions of the arrows to bring the crank arms 2 and 5 into alignment, and to locate the line thus defined substantially at a right angle to crank arm 3, brings the charge in the right hand cylinder to maximum compression. The charge is fired substantially at this instant. Piston rod 11 is urged to the left, and the force thus generated acts upon the pin 20 and through the aligned crank arms 2 and 5 upon the crank arm 3 that is now substantially at a right angle to the crank arms 2 and 5. This angular relationship is advantageous in that both crank arms 2 and 5 resist compression only, and the moment arm of crank arm 3 is a maximum, at 90°. Crank arm 3 is moved clockwise about the axis of its crankshaft 9. Since the pinion 31 is keyed to crank pin 30, and gear 21 is fixed to crank arm 2, relative movement between them through the gear 50 can only occur as crank arm 3 revolves about the axis of crankshaft 9, as indicated in FIGURE 4 by arrow A, and as crank arm 5 revolves bodily about the axis of pin 30, as indicated by arrow B. These two movements, coupled with rotation of gear 40 as it rolls about ring gear 4, effect rotation of idler gear 50 in the direction of arrow C, and of gear 21 in the direction of arrow D. The rotation of gear 21 in the direction of D can only occur when the crank arm 2 swings or revolves in the direction of arrow E, since the gear 21 is fixed upon the outer end of crank arm 2.

Figure 6:
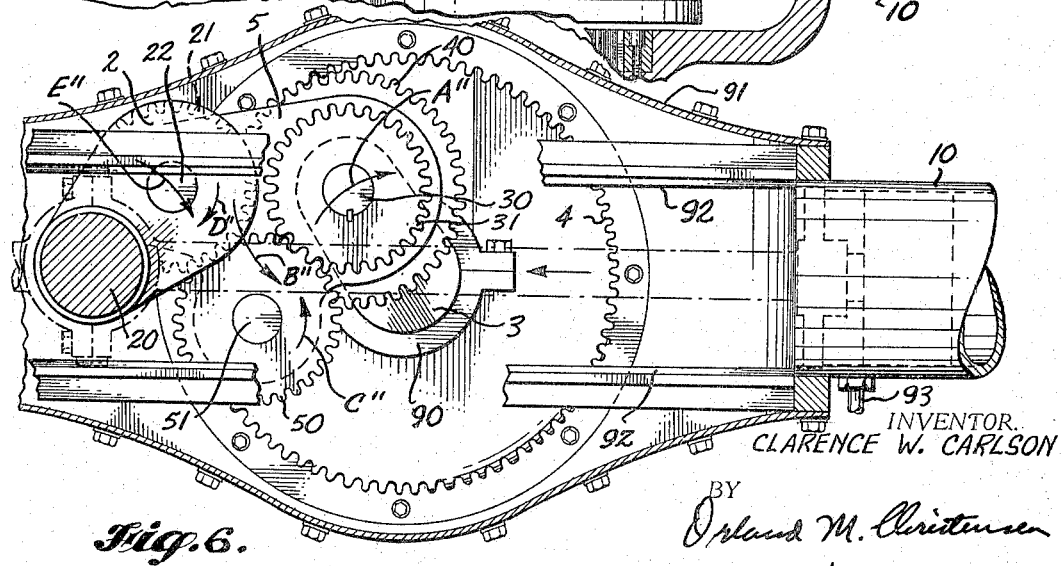
FIGURE 6 is a similar view, showing parts in positions corresponding to nearly full compression in the left hand cylinder, corresponding to an advance of 180° from FIGURE 4.
Figure 5:
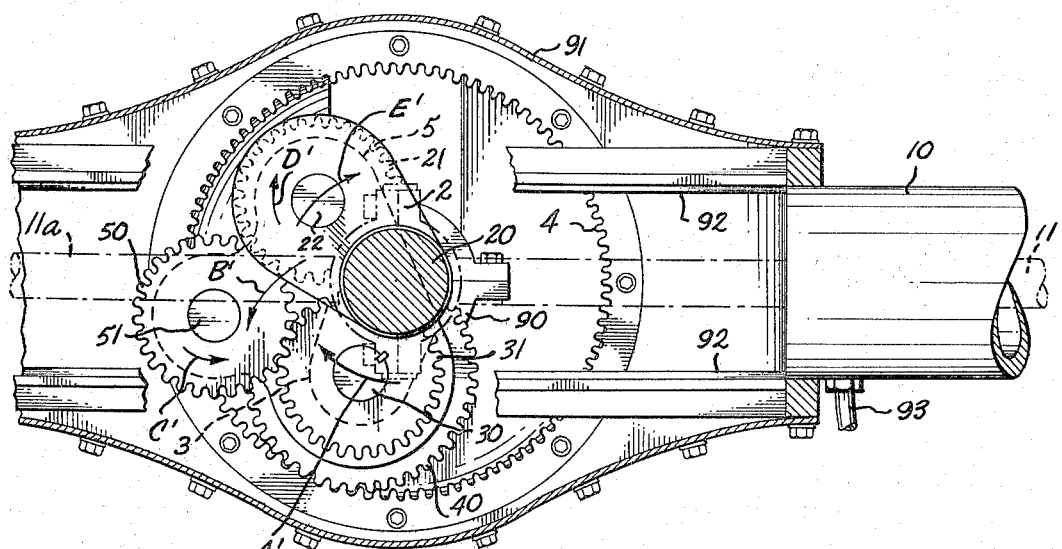
FIGURE 5 is a view similar to FIGURE 4, showing parts in positions corresponding to an advance of approximately 90° from their FIGURE 4 positions.

FIGURE 5 shows parts approximately midway between their initial position (FIGURE 4) and their 180° opposite position (FIGURE 6). The crank arm 3, still revolving in the direction of arrow A' about the axis of crankshaft 9, has caused greater angular movement B' of crank arm 5, and idler gear 50 moving in the direction of arrow C' causes rotation of gear 21 in the direction D'. The crank arm 2 has revolved in the direction E' through approximately 180°. The journal pin 20 substantially coincides with the axis of crankshaft 9.

The movements continue to the position of FIGURE 6. Here the crank arm 3 has reached a position 180° removed from its FIGURE 4 position, still revolving in the direction A". The crank arm 5, revolving in the direction of arrow B" about pin 30, has reached 180° from its initial position; idler gear 50, rotating according to arrow C", and gear 21 fast to crank arm 2 and rotating as shown by arrow D", have reached their 180° positions. Crank arm 2, revolving according to arrow E", is in the same position, inverted, as it was in FIGURE 4. Crank arms 2 and 3 are in the same relationship they were in FIGURE 4, inclined towards one another, but now upwardly; crank arms 2 and 5 will shortly come into alignment, substantially at a right angle to crank arm 3. The journal pin 20 is in the same relation to the left hand piston that it was in FIGURE 4 relative to the right hand piston. The application of force originating in the left hand piston now occurs, at the same mechanical advantage as before. The half-cycle repeats, but now to the right.

If there were no left hand cylinder, but only one at the right, the engine would still operate, but would require a flywheel or counter-balance to effect compression of the charge on the rightward movement of the piston and piston rod, and return of parts to their positions at the beginning of the cycle. The invention is particularly suited for use in a two-stroke cycle engine with opposed pistons.

There are certain relationships that must be maintained for proper operation of the engine. The planetary gear 40 is one-half the diameter of the fixed ring gear 4 with which it meshes. The gears 40 and 31 are controlled in their movements to orbit about the axis of crankshaft 9, and rotate conjointly, although not at the same angular rate, about their journal pin 30. Gears 31 and 21 are of like diameter and remain of like diameter, although that diameter may be larger or smaller than shown, even if the crank arms 2, 3 and 5 are of unequal length. They rotate alike about their respective axes, because of the intervening reversing idler gear 50. The size of idler gear 50 is not material. Pins 22 and 30, at the free ends of the respective crank arms 2 and 3, are always held apart a fixed distance by the third crank arm 5, although this distance will vary if the first and second crank arms are unlike in length, and this third crank arm 5 holds all gears properly meshed.

It will be noted that at the instant of ignition and application of the instantaneous force of the explosion (just past FIGURES 4 and 6) to the mechanical movement the crank arms 2 and 5 are aligned, so that the crank arm 2 whence the force is delivered, and its aligned crank arm 5, are at 90° to crank arm 3 that receives this force. In FIGURE 4 crank arms 2 and 3 are inclined downwardly, and in FIGURE 6 upwardly. By reason of this angular relationship the instantaneous force is delivered in each instance along a line that is tangential to the instantaneous revolved position of receiving crank arm 3, that is, at right angles to the crank arm 3 itself, wherefore the torque arm is a maximum. Also by reason of that relationship the force is delivered along a line that coincides with the longitudinal extent of crank arms 2 and 5, wherefore the latter readily resist the force in compression, and the crank arms and all bearings can be of minimum strength. As the ignited charge burns and expands, the favorable moment arm lessens, but it is most favorable at the instant of application of the maximum force, and does not become unfavorable until the expansive force is substantially fully dissipated; see the intermediate or half-way position of FIGURE 5. The overall result is a marked increase in the efficient utilization of the entire force of an explosion, and a lessening of strain and wear on the mechanical parts.

The intermeshing gear train will insure that crank arms 2, 3 and 5, and all other parts, maintain their intended positional relationships throughout a cycle. Except for this, friction wheels or the like might be used instead. It may be helpful, however, although not essential, to guide the bearing 13 for true rectilinear movement, as by guides 15 on the bearing that engage guideways 92 upon the casing 91. This avoids any departure of the bearing from a true rectilinear path, that might arise from backlash in the gear train.

It is the fixed relation of pin 30 to pinion 31, and hence of the latter to the crankshaft axis, the fixed relation of gear 21 to crank arm 2, and the intervening gear 50, that constrains the crankarm 5 to revolve once about the axis of pin 30 during each revolution of the crank arm 2. The ring gear 4 and planetary gear 40 function, together with the remainder of the gear train, to position the two crank arms 2 and 3 in the angular relation described above at approximately the instant of firing, and serve as a point of reaction from the casing for the forces acting upon the other gears. The charge can be compressed, within the cylinder, or injected into the compressed air therein. A charge inlet is at 93.

It has been assumed that the 90° angle between crank arms 2 and 3 will be employed, for that appears to be the most favorable angle, yet some other angle, differing somewhat from 90° but not approaching alignment, would still include more or less the advantages of this invention.

I claim as my invention:

1. An engine comprising at least one cylinder, a piston and a piston rod reciprocable axially of the cylinder, a bearing pin carried by and reciprocable with said piston rod between two limit positions, a crankshaft journaled midway between such limit positions and revoluble through 360°, a first crank arm fixed upon said crankshaft to revolve therewith, a second crank arm revoluble bodily about the axis of said bearing pin through 360°, a crank pin carried by the outer end of each of said crank arms, a third crank arm connected at its opposite ends to said crank pins and thus joining the first and second crank arms, a pinion fixed with relation to the outer end of said first crank arm and bodily revoluble therewith, a second gear fixed with relation to the outer end of said second crank arm and revoluble therewith, a reversing idler gear mounted upon said third crank arm and interconnecting said pinion and said second gear, and means carried in part by the outer end of said first crank arm to position the second and third crank arms in alignment and disposed at substantially 90° to the first crank arm substantially at each limit of reciprocation of the piston rod and the piston.

2. An engine as in claim 1, wherein the gear and the pinion at the outer ends of the second crank arm and the first crank arm, respectively, are of like effective diameter.

3. An engine as in claim 1, wherein the positioning means includes a fixed gear concentric with the crankshaft, and a planetary gear journaled coaxially of the pinion on the first crank arm and meshing with said fixed gear.

4. An engine as in claim 3, wherein the fixed gear is a ring gear, and the effective diameter of the planetary gear is half that of the ring gear.

5. An engine comprising a cylinder, a piston and piston rod reciprocable axially of the cylinder between opposite limit positions, a crankshaft including a first crank arm revoluble about the axis of the crankshaft, and carrying a pin at its outer end, a bearing pin carried by and reciprocable with the piston rod between opposite limit positions at the opposite sides of the crankshaft axis, a second crank arm revoluble bodily about said bearing pin and carrying a pin at its outer end, a third crank arm joining the two pins carried by the respective first and second crank arms, and freely revoluble bodily with respect to the second such pin, means constraining the third crank arm to revolve once about the axis of the first such pin during each revolution of the first crank arm, and means to position each of the first and second crank arms at substantially 90° to the other crank arm at each limit of reciprocation of the piston rod.

6. An engine comprising a cylinder, a piston and piston rod reciprocable axially of the cylinder between opposite limit positions, a crankshaft including a first crank arm revoluble unidirectionally about the axis of the crankshaft and carrying a pin at its outer end, a bearing pin carried by and reciprocable with the piston rod between opposite limit positions equidistantly at opposite sides of the crankshaft axis, a second crank arm revoluble bodily about said bearing pin and carrying a pin at its outer end, a third crank arm joining the two pins carried by the respective first and second crank arms, and freely revoluble bodily with respect to the second such pin, means constraining the third crank arm to revolve once about the axis of the first such pin during each revolution of the first crank arm, and gear means joining the two crank-arm-carried pins to effect 180° revolution of each of the first and second crank arms with each linear movement of the piston rod from one limit position to its opposite limit position.

7. An engine comprising a cylinder, a piston and piston rod reciprocable axially of the cylinder between opposite limit positions, a crankshaft including a first crank arm revoluble about the axis of the crankshaft and carrying a pin at its outer end, a bearing pin carried by and reciprocable with the piston rod between limit positions equidistantly at opposite sides of the crankshaft axis, a second crank arm revoluble bodily about said bearing pin and carrying a pin at its outer end, a third crank arm joining the two crank-arm-carried pins, and freely revoluble bodily with respect to the second such pin, a ring gear concentric with and surrounding the crankshaft axis, a planetary gear journaled upon the first crank-arm-carried pin and meshed with said ring gear, a first gear fixed with relation to said first crank arm, concentrically of its pin, a second gear fixed with relation to said second crank arm, concentrically of its pin, and an interconnection between said first and second gears to effect their one-to-one rotation as their respective arms revolve about their respective axes.

8. An engine as in claim 7, wherein the interconnection between the first and second gears consists of an idler gear meshing with both thereof, and journaled for free rotation upon the third crank arm.

9. An engine as in claim 7, wherein the two gears and the interconnection between them are arranged to effect 360° rotation of each gear about its axes with each 360° revolution of its supporting crank arm.

10. An engine as in claim 9, including a fixed rectilinear guideway disposed lengthwise of the path of the bearing pin, and a cooperating guide carried by the bearing pin and engaging said guideway.

11. An engine as in claim 7, wherein the first and second crank arms, in either limit position of the piston rod, are arranged each at an angle of substantially 90° to one another.

12. An engine as in claim 11, wherein at each limit position of the piston rod the third crank arm comes into alignment with the second crank arm, and both the latter are at a right angle to the first crank arm.

13. An engine as in claim 7, wherein the first and second crank arms are of like radius to their respective pins.

14. A mechanical movement for disposing a first and a second revoluble crank arm so that a momentary force directed along the second thereof is applied substantially perpendicularly to the instantaneous revolved position of the first thereof, said mechanical movement including a pin carried by the outer end of each crank arm, a third crank arm joining said pins and freely revoluble bodily with respect to the second thereof, a bearing pin reciprocable rectilinearly between two limit positions equidistantly at opposite sides of the axis of the first crank arm, the second crank arm being mounted upon said bearing pin to revolve 360° about the axis thereof, from an initial limit position wherein the first and second crank arms are thus disposed, means constraining said third crank arm to revolve once about the axis of the first pin, and means constraining the first two crank arms to revolve generally through equal angles, each about its axis.

15. A mechanical movement for disposing a first and a second revoluble crank arm so that a momentary force directed along the second thereof is applied substantially perpendicularly to the instantaneous revolved position of the first thereof, said mechanical movement including a ring gear concentric with and surrounding the axis of the first crank arm, a pin carried by the outer end of each crank arm, at like radial distances, a third crank arm joining said pins and freely revoluble bodily with respect to the second thereof, a bearing pin reciprocable rectilinearly along a line passing through the axes of the first and second crank arms, between two limit positions equidistantly at opposite sides of the axis of the first crank arm, the second crank arm being mounted upon and revoluble 360° about the axis of said bearing pin, the first and second crank arms, when the bearing pin is in one limit position, being disposed in the specified angular relationship, a planetary gear rotatable about the first pin and meshing with said ring gear, a gear upon said first pin and fixed with relation to the first crank arm, a similar gear upon said second pin and fixed with relation to the second crank arm, and means constraining the two gears for conjoint rotation, each about the axis of its pin, to bring the first and second crank arms into the specified angular relationship at the opposite limit position.

16. A mechanical movement as in claim 15, including an idler gear meshed with both pin-mounted gears, and carried by and for free rotation with respect to the third crank arm, constituting the means to constrain such gears for conjoint rotation.

17. A mechanical movement as in claim 15, wherein the planetary gear is of a diameter one-half the diameter of the ring gear, and the two crank-arm-carried gears are each of like diameter.

18. A mechanical movement as in claim 15, wherein the two crank arms are of equal radius to their respective pins.

19. A mechanical movement for use between a bearing pin rectilinearly reciprocable between two limit positions and a revoluble crankshaft the axis whereof is disposed midway between such limit positions, said mechanical movement comprising a first crank arm upon and revoluble with the crankshaft and a second crank arm carried upon and revoluble about the axis of said bearing pin, said crank arms in a limit position being substantially at a right angle to one another, a third crank arm joining the outer ends of the first and second crank arms to maintain such ends at a constant spacing, a pinion fixed with relation to the outer end of said first crank arm and bodily revoluble therewith, a gear fixed with relation to the outer end of the second crank arm and revoluble therewith, and means interconnecting said pinion and gear to effect their conjoint rotation as they revolve with their respective crank arms.

20. A mechanical movement as in claim 19, wherein the first two crank arms are of like radius, and the pinion and gear are of like diameter.

21. An engine comprising a cylinder, a piston and piston rod reciprocable axially of the cylinder, a crankshaft journaled in axial alignment with but at right angles to the axis of the cylinder, a first crank arm upon and revoluble with said crankshaft, a bearing pin carried by and reciprocable with the piston rod between limit positions equidistantly at opposite sides of the crankshaft axis, a second crank arm revoluble bodily about said bearing pin, a ring gear fixedly positioned concentrically of the crankshaft axis, and interconnecting means including a gear meshing with said ring gear, and a gear fixed relative to and revoluble with the outer end of each crank arm, and a third crank arm joining the outer ends of the first and second crank arms, said interconnecting means being arranged to dispose the first and the second crank arms at a right angle to one another of each limit position.

22. An engine as in claim 21, wherein the interconnecting means is arranged to dispose the third crank arm in substantial alignment with the second crank arm, and both perpendicular to the first, at each limit position.

23. An engine comprising a cylinder, a piston and piston rod reciprocable axially of the cylinder, a crankshaft journaled in axial alignment with but at right angles to the axis of the cylinder, a ring gear fixed coaxially about the axis of the crankshaft, a first crank arm upon and revoluble with said crankshaft, a bearing pin carried by and reciprocable with the piston rod between limit positions equidistantly at opposite sides of the crankshaft axis, a second crank arm revoluble bodily about said bearing pin, a pinion fixed with respect to and revoluble with the outer end of the first crank arm, a second gear fixed with respect to and revoluble with the outer end of the second crank arm, means interconnecting the outer ends of said two crank arms to maintain the same at a given spacing, means interconnecting said pinion and gear to effect conjoint rotation of both, and a planetary gear meshing with the ring gear and journaled upon the outer end of the first crank arm, to constrain the two crank arms to a like angular relationship at each limit position.

References Cited by the Examiner
UNITED STATES PATENTS
952,383    3/1910    Tomer _____ 74—52

FOREIGN PATENTS
511,945   10/1920   France.
787,595    7/1935   France.
 54,335    6/1948   France.
    (1st Addition to Patent No. 916,300)

FRED C. MATTERN, JR., *Primary Examiner.*

D. H. THIEL, *Assistant Examiner.*